(12) United States Patent
Kakamu et al.

(10) Patent No.: US 10,663,949 B2
(45) Date of Patent: May 26, 2020

(54) NUMERICAL CONTROL DEVICE

(71) Applicant: Mitsubishi Electric Corporation, Tokyo (JP)

(72) Inventors: Yuki Kakamu, Tokyo (JP); Takeshi Tsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/329,218

(22) PCT Filed: Oct. 20, 2016

(86) PCT No.: PCT/JP2016/081166
§ 371 (c)(1),
(2) Date: Feb. 28, 2019

(87) PCT Pub. No.: WO2018/073946
PCT Pub. Date: Apr. 26, 2018

(65) Prior Publication Data
US 2019/0250590 A1 Aug. 15, 2019

(51) Int. Cl.
G05B 19/4103 (2006.01)
G05B 19/18 (2006.01)
B23Q 15/00 (2006.01)

(52) U.S. Cl.
CPC ......... G05B 19/4103 (2013.01); B23Q 15/00 (2013.01); G05B 19/182 (2013.01); G05B 2219/49344 (2013.01)

(58) Field of Classification Search
CPC .............. G05B 19/4103; G05B 19/182; G05B 2219/49344; B23Q 15/00

USPC ......................................................... 700/189
See application file for complete search history.

(56) References Cited

U.S. PATENT DOCUMENTS

| 2007/0046677 | A1* | 3/2007 | Hong | ..................... G05B 19/41 345/442 |
|---|---|---|---|---|
| 2012/0022682 | A1 | 1/2012 | Nakamura et al. | |
| 2015/0205287 | A1* | 7/2015 | Igarashi | ............... B23Q 1/0045 318/591 |

(Continued)

FOREIGN PATENT DOCUMENTS

| CN | 102375432 A | 3/2012 |
| JP | 2013-210926 A | 10/2013 |
| WO | 2010/109536 A1 | 9/2010 |

OTHER PUBLICATIONS

Office Action dated Sep. 25, 2019, issued in corresponding Chinese Application No. 201680090120.2, 10 pages (with English Translation).

(Continued)

Primary Examiner — Ziaul Karim
(74) Attorney, Agent, or Firm — Xsensus LLP

(57) ABSTRACT

A numerical control device is a numerical control device that controls a machine tool including a plurality of axes, and includes a reading unit that reads a machining program for machining a workpiece, and when the machining program read by the reading unit is a machining program for simultaneously operating five or more axes of the plurality of axes, controls operation of the five or more axes to be simultaneously operated in the machining program by dividing the operation into a plurality of sets of operation of four or less axes.

8 Claims, 9 Drawing Sheets

(56) References Cited

U.S. PATENT DOCUMENTS

2015/0378341 A1* 12/2015 Kobayashi ............. G05B 19/19
                                                            700/186
2016/0259327 A1*  9/2016 Oonishi ............. G05B 19/4155
2017/0293288 A1* 10/2017 Nakaya ............. G05B 19/4155

OTHER PUBLICATIONS

Decision to Grant a Patent received for Japanese Patent Application No. 2017-517396, dated Apr. 25, 2017, 6 pages including English Translation.
International Search Report dated Jan. 10, 2017 for PCT/JP2016/081166 filed on Oct. 20, 2016, 6 pages including English Translation.

* cited by examiner

NUMERICAL CONTROL DEVICE

CROSS-REFERENCE TO RELATED APPLICATIONS

The present application is based on PCT filing PCT/JP2016/081166, filed Oct. 20, 2016, which is incorporated herein by reference.

FIELD

The present invention relates to a numerical control device that controls a machine tool.

BACKGROUND

Conventionally, a machine tool controls a position and orientation of a tool with respect to a workpiece by operating one or both of the tool that actually performs machining on the workpiece and a table on which the workpiece is placed, in accordance with a machining program for machining the workpiece.

Specifically, the machine tool includes five or more axes including three mutually orthogonal axes for performing translational movement, a rotation axis of the tool, and a rotation axis of the table, and controls the position and orientation of the tool with respect to the workpiece by operating each axis in accordance with control by a numerical control device based on the machining program. Operation of the axes is translation or rotation. By controlling, the machine tool machines the workpiece in accordance with the machining program.

When the machining program includes a command for simultaneously operating five or more axes in the machine tool, if the numerical control device cannot simultaneously control operation of the five or more axes, the numerical control device cannot operate each axis in accordance with the command. For that reason, conventionally, in a case where a numerical control device that cannot simultaneously control operation of five or more axes controls the machine tool, when the position and orientation are controlled of the tool with respect to the workpiece, the tool is once separated from the workpiece, and the tool is brought close to the workpiece after the orientation of the tool is changed (for example, see Patent Literature 1).

CITATION LIST

Patent Literature

Patent Literature 1: Japanese Patent Application Laid-open No. 2013-210926

SUMMARY

Technical Problem

However, in the above-described conventional technique, since the tool is separated from the workpiece, a problem occurs that machining time is increased. It is not easy to create a machining program in which the position and orientation are implemented of the tool with respect to the workpiece after a command for simultaneously operating five or more axes is tentatively executed, and the five or more axes are not simultaneously operated.

The present invention has been made in view of the above, and it is an object to obtain a numerical control device that brings the position and orientation of the tool with respect to the workpiece to the position and orientation specified by a machining program without increasing the machining time when the machining program is given for simultaneously operating five or more axes in a situation where operation of the five or more axes cannot be simultaneously controlled.

Solution to Problem

To solve the problem described above and achieve the object described above, the present invention provides a numerical control device that controls a machine tool including a plurality of axes. The numerical control device includes a reading unit that reads a machining program for machining a workpiece. When the machining program read by the reading unit is a machining program for simultaneously operating five or more axes of the plurality of axes, the numerical control device controls operation of the five or more axes indicated to be simultaneously operated in the machining program by dividing the operation into a plurality of sets of operation of four or less axes.

Advantageous Effects of Invention

The numerical control device according to the present invention has an effect that the position and orientation of the tool with respect to the workpiece can be brought to the position and orientation specified by a machining program without increasing the machining time when the machining program is given for simultaneously operating five or more axes in a situation where operation of the five or more axes cannot be simultaneously controlled.

DESCRIPTION OF EMBODIMENTS

Hereinafter, a numerical control device according to embodiments of the present invention will be described in detail with reference to the drawings. Incidentally, the invention is not limited to the embodiments.

First Embodiment

Figure 1:
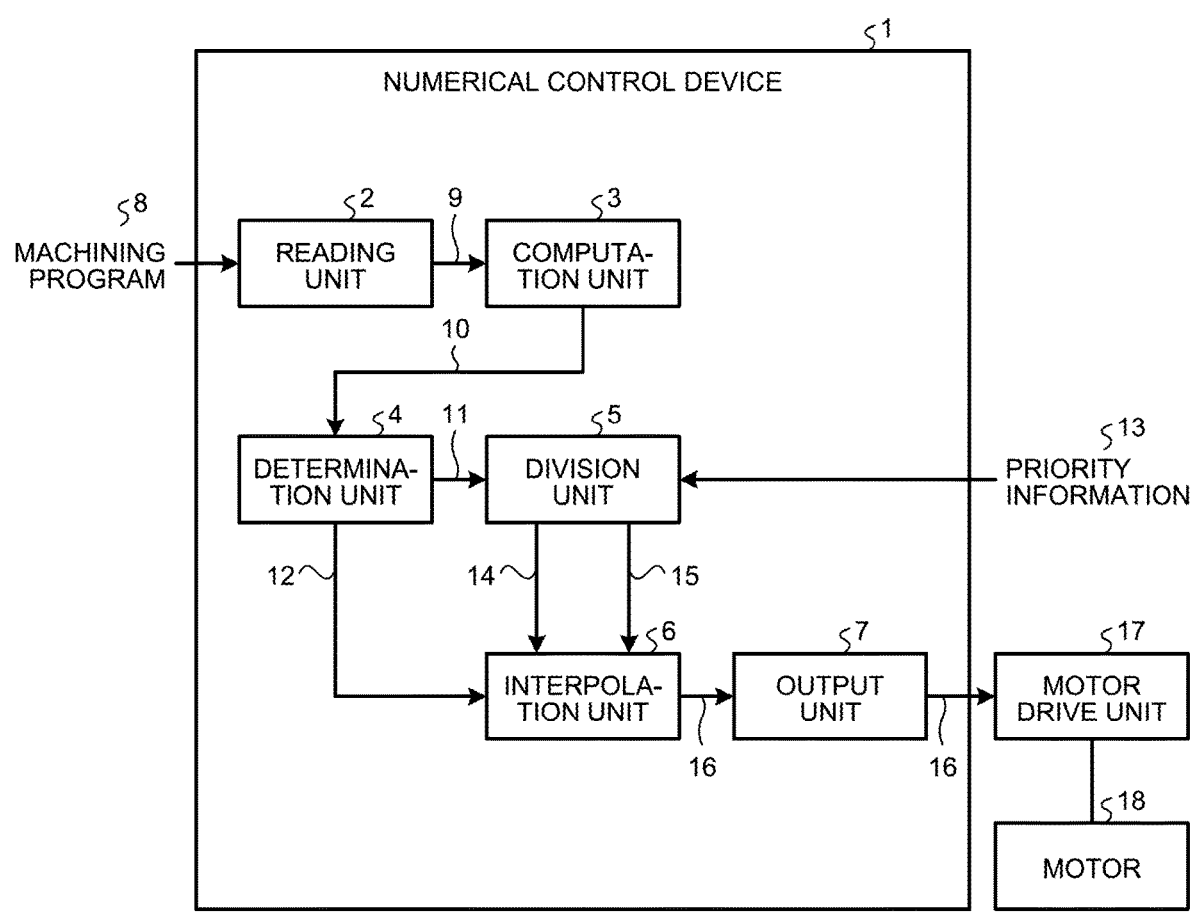
FIG. 1 is a diagram illustrating a configuration of a numerical control device in a first embodiment.

FIG. 1 is a diagram illustrating a configuration of a numerical control device 1 in a first embodiment. In FIG. 1, for describing the numerical control device 1, a motor drive unit 17 and a motor 18 are also illustrated. The numerical control device 1 is a device that controls a machine tool, and the motor drive unit 17 and the motor 18 are part of a plurality of constituent elements in the machine tool. The motor drive unit 17 drives the motor 18.

The machine tool is a device that machines a workpiece in accordance with a machining program 8 for machining the workpiece, and includes a plurality of axes for machining the workpiece. One of the plurality of axes is an axis for changing the orientation of a tool in the machine tool, and is enabled to change the orientation of the tool with respect to the workpiece by rotating. The tool cuts the workpiece, for example by rotating, to form a hole or opening in the workpiece.

The machine tool includes a table on which the workpiece is placed, and another one of the plurality of axes is an axis for rotating the table. The machine tool includes an X axis, a Y axis, and a Z axis for translationally moving the entire machine tool in each of the X direction, the Y direction, and the Z direction. Each of the X axis, the Y axis, and the Z axis is also a part of the plurality of axes. The numerical control device 1 controls a position and orientation of the tool with respect to the workpiece by controlling operation of the plurality of axes included in the machine tool. The motor 18 operates a constituent element corresponding to each of the plurality of axes. The operation is translational movement or rotation. Examples of a constituent element operated by multiple axes include one or both of the tool and the table.

As described above, since the machine tool is the device that machines the workpiece in accordance with the machining program 8, and the numerical control device 1 is the device that controls the machine tool, the numerical control device 1 includes a reading unit 2 that reads the machining program 8. The numerical control device 1 further includes a computation unit 3 that computes an amount of operation of each of the plurality of axes described above based on the machining program 8 read by the reading unit 2.

Specifically, the reading unit 2 analyzes the machining program 8 read, and outputs a command 9 in the machining program 8 to the computation unit 3, and the computation unit 3 computes the amount of operation of each of the plurality of axes described above on the basis of the command 9. For example, when the machining program 8 specifies the position of the tip of the tool and the orientation of the tool, the computation unit 3 performs coordinate transformation and computes the amount of operation of each of the plurality of axes described above based on the position of the tip of the tool and the orientation of the tool. When it is unnecessary to perform the coordinate transformation, the computation unit 3 performs computation of determining an amount of operation specified in the command 9 as the amount of operation of each of the plurality of axes described above.

The numerical control device 1 further includes a determination unit 4 that determines whether or not a result obtained by the computation unit 3 indicates that five or more axes of the plurality of axes described above are simultaneously operated. Specifically, the computation unit 3 outputs to the determination unit 4 information 10 on the amount of operation of each of the plurality of axes described above obtained by performing computation, and the determination unit 4 determines whether or not the information 10 on the amount of operation of each of the plurality of axes indicates that the five or more axes are simultaneously operated. For example, when the amount of operation of each of the five or more axes of the plurality of axes indicated by the information 10 is not zero, the determination unit 4 determines that the result obtained by the computation unit 3 indicates that the five or more axes are simultaneously operated.

The numerical control device 1 further includes a division unit 5 that divides operation of the five or more axes indicated to be simultaneously operated into a plurality of sets of operation of four or less axes when it is determined by the determination unit 4 that the above-described result indicates that the five or more axes of the plurality of axes are simultaneously operated. The division unit 5 calculates the amount of operation of each axis in each of the plurality of sets obtained by the division.

Specifically, when it is determined that the information 10 on the amount of operation of each of the plurality of axes indicates that the five or more axes are simultaneously operated, the determination unit 4 outputs to the division unit 5 information 11 including a determination result and the information 10 on the amount of operation of each of the plurality of axes described above. On the basis of the information 11, the division unit 5 divides the operation of the five or more axes indicated to be simultaneously operated into the plurality of sets of operation of four or less axes. In addition, on the basis of the information 11, the division unit 5 calculates the amount of operation of each axis in each of the plurality of sets obtained by the division.

When dividing, for example, when the position of the tip of the tool and the orientation of the tool are specified in the machining program 8, the division unit 5 performs division not to cause the tip of the tool to deviate from a path of when the five or more axes are simultaneously operated. As described above, each of the plurality of sets is a set of the operation of four or less axes.

The division unit 5 may select a set including operation of an axis to be operated first from among the plurality of sets in accordance with priority information 13, first calculate an amount of operation of each axis of the set selected, and after calculating the amount of operation of each axis of the set selected, calculate an amount of operation of each axis of a set other than the set selected among the plurality of sets. The priority information 13 is information indicating the axis to be operated first among the five or more axes indicated to be simultaneously operated.

For example, the axis to be operated first is an axis that rotates the tool. Alternatively, for example, the axis to be operated first is an axis that rotates the table. The priority information 13 is input to the numerical control device 1 by a user of the numerical control device 1, for example. The priority information 13 may be set in advance in the numerical control device 1. Specifically, the priority information 13 may be set in advance in the division unit 5. When the priority information 13 is set in advance in the numerical control device 1, the axis to be operated first may be set for each machine tool.

The numerical control device 1 further includes an interpolation unit 6 that calculates a position for each control period of each constituent element in the machine tool in a case where operation of each axis in each of the plurality of sets obtained by the division unit 5 is performed in order in accordance with the control period. Examples of a constituent element whose position is calculated include one or both of the tool and the table.

Specifically, the division unit 5 outputs to the interpolation unit 6 information on the amount of operation of each axis in each of the plurality of sets obtained by the division. For example, when two sets are obtained by the division unit 5, the division unit 5 outputs to the interpolation unit 6 information 14 on the amount of operation of each axis in one set of the two sets, and information 15 on the amount of operation of each axis in the other set of the two sets.

For example, when operation of each axis in one set of the two sets obtained by the division is performed prior to operation of each axis in the other set, the interpolation unit 6 calculates a position of the tool after the operation is performed of each axis in the one set, by using information on a position of the tool before the operation is performed of each axis in the one set and the information 14 on the amount of operation of each axis in the one set. Next, the interpolation unit 6 calculates a position of the tool after the operation is performed of each axis for each control period in the other set, by using information on the position of the tool after the operation is performed of each axis in the one set and the information 15 on the amount of operation of each axis in the other set. Incidentally, when three or more sets are obtained by the division, the division unit 5 calculates an amount of operation of each axis in each of the three or more sets, and outputs to the interpolation unit 6 information on the amount of operation of each axis obtained by the calculation for each set.

The numerical control device 1 further includes an output unit 7 that outputs information 16 including the information 10 on the amount of operation of each axis in each of the plurality of sets calculated by the division unit 5 and a position of the constituent element in the machine tool calculated by the interpolation unit 6, to the motor drive unit 17 in order in accordance with the control period for each set. Specifically, the interpolation unit 6 outputs the above-described information 16 to the output unit 7 in accordance with the control period for each set, and the output unit 7 outputs the information 16 supplied from the interpolation unit 6 to the motor drive unit 17 in order in accordance with the control period for each set.

The motor drive unit 17 drives the motor 18 in accordance with the information 16 supplied from the output unit 7.

When determining that the result obtained by the computation unit 3 does not indicate that the five or more axes of the plurality of axes are simultaneously operated, the determination unit 4 outputs to the interpolation unit 6 information 12 including a determination result and the information 10 on the amount of operation of each of the plurality of axes described above. The interpolation unit 6 calculates the position for each control period of the constituent element of the machine tool, and outputs to the output unit 7 the information 16 including information on the position obtained by the calculation and the information 10.

That is, when the machining program 8 read by the reading unit 2 is a machining program for simultaneously operating the five or more axes of the plurality of axes, the numerical control device 1 controls the operation of the five or more axes indicated to be simultaneously controlled in the machining program 8 by dividing the operation into the plurality of sets of operation of four or less axes.

Incidentally, when the division unit 5 selects the set including the operation of the axis to be operated first among the plurality of sets in accordance with the priority information 13, the output unit 7 outputs to the motor drive unit 17 information on the amount of operation of each axis of the set selected prior to information on the amount of operation of each axis of the set other than the set selected among the plurality of sets.

Figure 2:
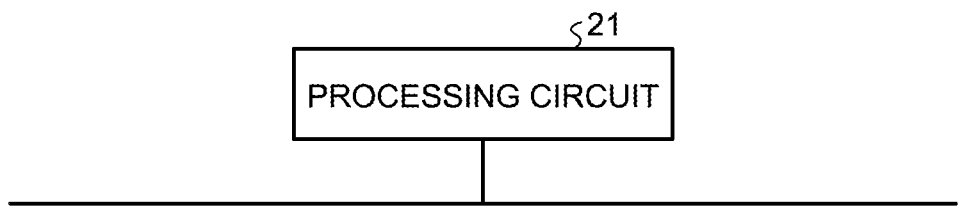
FIG. 2 is a diagram illustrating a processing circuit in a case where at least a part of constituent elements constituting a reading unit, a computation unit, a determination unit, a division unit, an interpolation unit, and an output unit included in the numerical control device in the first embodiment is implemented by the processing circuit.

At least a part of functions of the reading unit 2, the computation unit 3, the determination unit 4, the division unit 5, the interpolation unit 6, and the output unit 7 included in the numerical control device 1 may be implemented by a processing circuit 21. FIG. 2 is a diagram illustrating the processing circuit 21 in a case where at least a part of constituent elements constituting the reading unit 2, the computation unit 3, the determination unit 4, the division unit 5, the interpolation unit 6, and the output unit 7 included in the numerical control device 1 in the first embodiment is implemented by the processing circuit 21.

The processing circuit 21 is dedicated hardware. That is, the processing circuit 21 is, for example, a single circuit, a composite circuit, a programmed processor, a parallel programmed processor, an application specific integrated circuit (ASIC), a field-programmable gate array (FPGA), or a combination thereof. Part of the reading unit 2, the computation unit 3, the determination unit 4, the division unit 5, the interpolation unit 6, and the output unit 7 may be dedicated hardware separate from the rest.

Figure 3:
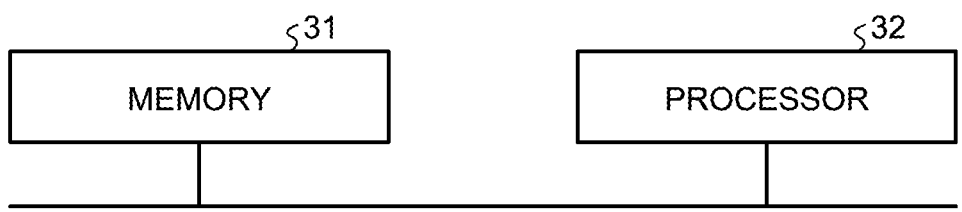
FIG. 3 is a diagram illustrating a processor in a case where a function of at least a part of the reading unit, the computation unit, the determination unit, the division unit, the interpolation unit, and the output unit included in the numerical control device in the first embodiment is implemented by the processor.

A function of at least a part of the reading unit 2, the computation unit 3, the determination unit 4, the division unit 5, the interpolation unit 6, and the output unit 7 included in the numerical control device 1 may be implemented by a processor 32 that executes a program stored in a memory 31. FIG. 3 is a diagram illustrating the processor 32 in a case where the function of at least a part of the reading unit 2, the computation unit 3, the determination unit 4, the division unit 5, the interpolation unit 6, and the output unit 7 included in the numerical control device 1 in the embodiment is implemented by the processor 32. The processor 32 is a central processing unit (CPU), a processing device, a computation device, a microprocessor, a microcomputer, or a digital signal processor (DSP). In FIG. 3, the memory 31 is also illustrated.

When the function of at least a part of the reading unit 2, the computation unit 3, the determination unit 4, the division unit 5, the interpolation unit 6, and the output unit 7 is implemented by the processor 32, the function of the part is implemented by the processor 32 and software, firmware, or a combination of software and firmware. The software or firmware is described as a program and stored in the memory 31. The processor 32 reads and executes the program stored in the memory 31, thereby implementing the function of at least a part of the reading unit 2, the computation unit 3, the determination unit 4, the division unit 5, the interpolation unit 6, and the output unit 7.

That is, when the function of at least a part of the reading unit 2, the computation unit 3, the determination unit 4, the division unit 5, the interpolation unit 6, and the output unit 7 is implemented by the processor 32, the numerical control device 1 includes the memory 31 for storing a program by which steps are resultantly executed, the steps being executed by part of the reading unit 2, the computation unit 3, the determination unit 4, the division unit 5, the interpolation unit 6, and the output unit 7. It can be said that the program stored in the memory 31 causes a computer to execute a procedure or method executed by part of the reading unit 2, the computation unit 3, the determination unit 4, the division unit 5, the interpolation unit 6, and the output unit 7.

The memory 31 is, for example, a nonvolatile or volatile semiconductor memory such as a random access memory (RAM), a read only memory (ROM), a flash memory, an erasable programmable read only memory (EPROM), or an electrically erasable programmable read only memory (EEPROM); a magnetic disk; a flexible disk; an optical disk; a compact disk; a mini disk; a digital versatile disk (DVD); or the like.

Regarding the plural functions of the reading unit 2, the computation unit 3, the determination unit 4, the division unit 5, the interpolation unit 6, and the output unit 7, part of the plural functions may be implemented by dedicated hardware, and the rest of the plural functions may be implemented by software or firmware. As described above, the plural functions of the reading unit 2, the computation unit 3, the determination unit 4, the division unit 5, the interpolation unit 6, and the output unit 7 can be implemented by hardware, software, firmware, or a combination thereof.

Figure 4:
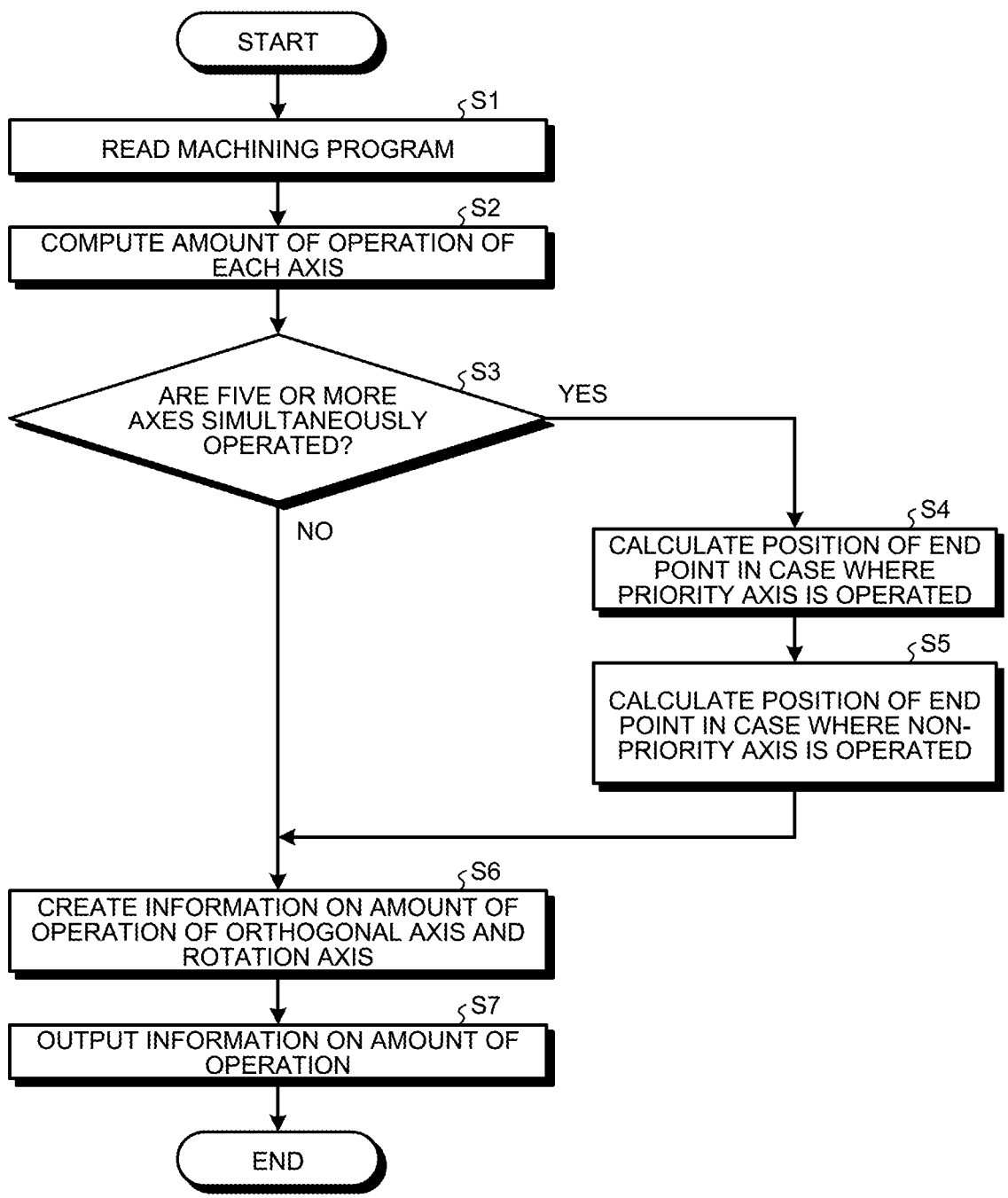
FIG. 4 is a flowchart illustrating a procedure of operation of the numerical control device in the first embodiment.

Next, operation will be described of the numerical control device 1 in the first embodiment. FIG. 4 is a flowchart illustrating a procedure of the operation of the numerical control device 1 in the first embodiment. With reference to FIG. 4, the operation of the numerical control device 1 will be described in a case where two sets are obtained by the division unit 5. First, the reading unit 2 reads the machining program 8 and analyzes the machining program 8 (S1). Next, the computation unit 3 computes the amount of operation of each of the plurality of axes included in the machine tool on the basis of the command 9 in the machining program 8 read by the reading unit 2 (S2). In the case of computation of the amount of operation of each axis, when it is necessary to perform coordinate transformation, the computation unit 3 computes the amount of operation of each axis after performing the coordinate transformation.

Next, the determination unit 4 determines whether or not the result obtained by the computation unit 3 in step S2 indicates that the five or more axes of the plurality of axes described above are simultaneously operated (S3). When it is determined by the determination unit 4 that the above-described result indicates that the five or more axes are simultaneously operated (Yes in S3), the division unit 5 divides the operation of the five or more axes indicated to be simultaneously operated into two sets of operation of four or less axes, and selects a first set including the operation of an axis to be operated first among the two sets, and calculates the amount of operation of each axis in the first set. The interpolation unit 6 calculates a position of an end point of one or both of the tool and the table in a case where each axis in the first set is operated (S4). In step S4 of FIG. 4, the axis to be operated first is described as "priority axis".

After the operation of step S4 is ended, the division unit 5 calculates the amount of operation of each axis in a second set different from the first set of the two sets. The interpolation unit 6 calculates a position of an end point of one or both of the tool and the table in a case where each axis in the second set is operated (S5). Since the second set does not include the operation of the axis to be operated first, in step S5 of FIG. 4, the axis that is not the axis to be operated first is described as "non-priority axis", and in step S5, the interpolation unit 6 calculates the position of the end point of one or both of the tool and the table in the case where each axis in the second set including the operation of the non-priority axis is operated.

When it is determined by the determination unit 4 that the result obtained by the computation unit 3 does not indicate that the five or more axes are simultaneously operated (No in S3), and when the operation of step S5 is performed, the operation of the numerical control device 1 shifts to step S6. In step S6, the interpolation unit 6 creates, for each control period, information on part of an amount of operation of an orthogonal axis of the machine tool, an amount of operation of a rotation axis of the tool, and an amount of operation of a rotation axis of the table on which the workpiece is placed.

Next, the output unit 7 outputs information on the amount of operation of the orthogonal axis and rotation axis of the first set to the motor drive unit 17 in accordance with the control period, and after outputting the information on the amount of operation of the orthogonal axis and rotation axis of the first set to the motor drive unit 17, outputs information on the amount of operation of the orthogonal axis and rotation axis of the second set to the motor drive unit 17 in accordance with the control period (S7). In step S7, when outputting the information on the amount of operation of the orthogonal axis and rotation axis of the first set to the motor drive unit 17, the output unit 7 also outputs information on the position of the end point calculated by the interpolation unit 6 in step S4 to the motor drive unit 17. In addition, in step S7, when outputting the information on the amount of operation of the orthogonal axis and rotation axis of the second set to the motor drive unit 17, the output unit 7 also outputs information on the position of the end point calculated by the interpolation unit 6 in step S5 to the motor drive unit 17.

The motor drive unit 17 drives the motor 18 in accordance with the information supplied from the output unit 7. As a result, each axis of the second set is operated after each axis of the first set is operated in the machine tool, whereby when operation of each axis of the second set is ended, a positional relationship between the tool and the table in the machine tool and an orientation of the tool with respect to the table are coincide with a relationship and an orientation specified by the command 9 in the machining program 8. That is, when the operation of each axis of the second set is ended, the position and orientation of the tool with respect to the workpiece coincide with a position and orientation specified by the command 9 in the machining program 8.

As described above, when it is determined by the determination unit 4 that the result obtained by the computation unit 3 indicates that the five or more axes of the plurality of axes are simultaneously operated, the division unit 5 divides the operation of the five or more axes indicated to be simultaneously operated into the plurality of sets of operation of four or less axes, and calculates the amount of operation of each axis in each of the plurality of sets obtained by the division. The plurality of axes is axes included in the machine tool.

Even if the numerical control device 1 cannot perform control to simultaneously operate only four or less axes, the division unit 5 divides the operation of the five or more axes indicated to be simultaneously operated into the plurality of sets of operation of four or less axes, so that the numerical control device 1 can operate each of the plurality of axes included in the machine tool to a state specified by the command 9 in the machining program 8.

When the numerical control device 1 operates the five or more axes, it becomes unnecessary to separate the tool from the workpiece. That is, when the machining program 8 for simultaneously operating the five or more axes is given in a situation where the operation of the five or more axes cannot be simultaneously controlled, the numerical control device 1 can bring the position and orientation of the tool with respect to the workpiece to the position and orientation specified by the machining program 8 without increasing the machining time. Furthermore, the numerical control device 1 does not require change of the machining program 8.

When the user of the numerical control device 1 inputs the priority information 13 to the numerical control device 1, the user can specify a set including the operation of the axis to be operated first among the plurality of sets obtained by the division unit 5.

The machine tool includes, for example, the orthogonal axis and the rotation axis. A case is assumed where in a coordinate system newly defined by performing one or both of translation and rotation for a reference coordinate system, indexing operation is performed that positions the orthogonal axis and the rotation axis to control the position and orientation of the tool with respect to the workpiece in the machine tool. In that case, when the five or more axes are simultaneously operated, the division unit 5 divides the operation of the five or more axes into the plurality of sets of operation of four or less axes as described above. When the machining program 8 for simultaneously operating the five or more axes is given in a situation where operation of the five or more axes cannot be simultaneously controlled, due to the division performed by the division unit 5, the numerical control device 1 can bring the position and orientation of the tool with respect to the workpiece to the position and orientation specified by the machining program 8 without increasing the machining time.

Second Embodiment

Figure 5:
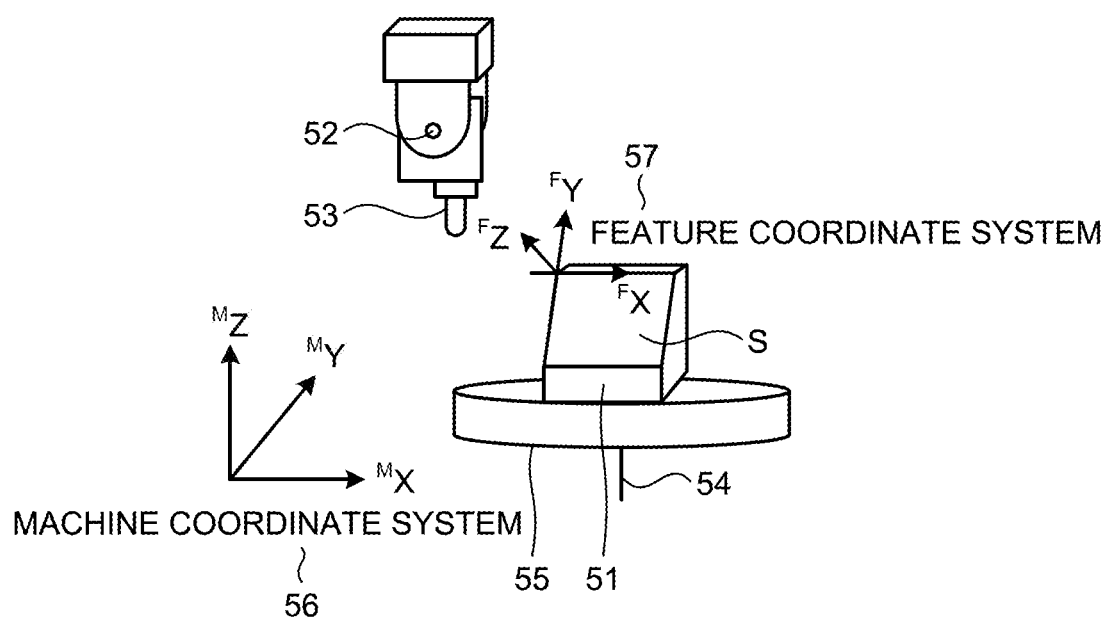
FIG. 5 is a diagram illustrating an example of a machine tool and a workpiece in a second embodiment.

Next, an example will be described of the operation of the numerical control device 1 described in the first embodiment with reference to FIGS. 5 and 6. FIG. 5 is a diagram illustrating an example of the machine tool and a workpiece 51 in a second embodiment. The numerical control device of the second embodiment is the same as the numerical control device 1 of the first embodiment. The machine tool of the second embodiment is constituted by a tool 53 having a first rotation axis 52 and a table 55 having a second rotation axis 54.

In the machine tool, a machine coordinate system 56 and a feature coordinate system 57 are defined. The machine tool has the X axis, Y axis, and Z axis respectively corresponding to a $^{M}X$ direction, a $^{M}Y$ direction, and a $^{M}Z$ direction in the machine coordinate system 56. Each of the X axis, the Y axis, and the Z axis is orthogonal to any of the other axes. Since there is a possibility that uncertainty occurs in a case where the axes are illustrated, the X axis, Y axis, and Z axis are not illustrated in FIG. 5. The first rotation axis 52 in the tool 53 is an axis that rotates around the Y axis, and the second rotation axis 54 of the table 55 is an axis that rotates around the Z axis. The machine tool of the second embodiment includes five axes of the first rotation axis 52, the second rotation axis 54, the X axis, the Y axis, and the Z axis.

The feature coordinate system 57 is a coordinate system rotated by offsetting the origin with respect to the machine coordinate system 56, and is a coordinate defined with respect to one plane S of the workpiece 51. The workpiece 51 is placed on the table 55, and the plane S is a plane that is neither parallel nor orthogonal to the plane of the table 55. Since the above-described plane S of the workpiece 51 is neither parallel nor orthogonal to the plane of the table 55, the plane S will be described as "inclined plane S" below. That is, the feature coordinate system 57 is an orthogonal coordinate defined with respect to the inclined plane S. Furthermore, a $^{F}X$ direction and a $^{F}Y$ direction in the feature coordinate system 57 are parallel to the inclined plane S, and a $^{F}Z$ direction in the feature coordinate system 57 is orthogonal to the inclined plane S.

Hereinafter, operation will be described of making a direction of the tool 53 parallel to the $^{F}Z$ direction in the feature coordinate system 57 while maintaining a position of the tip of the tool 53 with respect to the workpiece 51. This operation will be referred to as "first operation" below. The direction of the tool 53 is a direction from the tip of the tool 53 to the bottom of the tool 53. In a case where the first operation is performed in one step, the five axes of three orthogonal axes and two rotation axes of the machine tool are simultaneously operated. For that reason, when the numerical control device 1 can simultaneously operate only four or less axes, the numerical control device 1 cannot control the first operation by the conventional technique.

Figure 6:
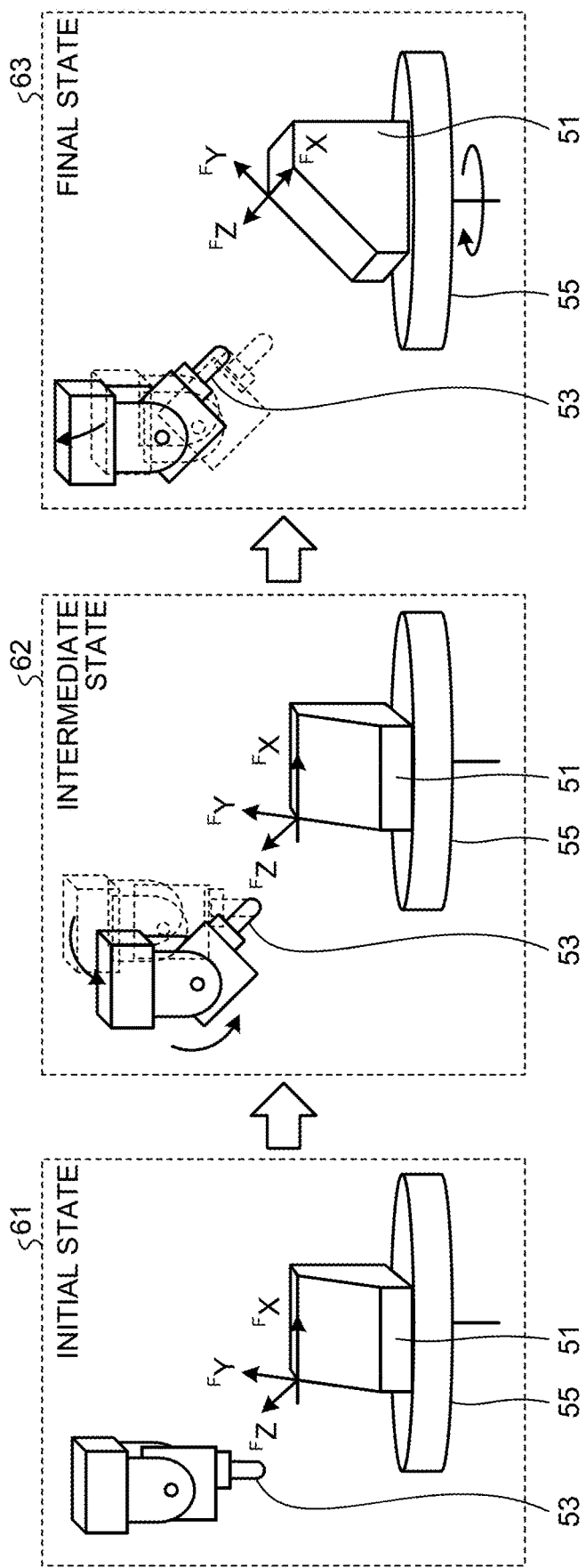
FIG. 6 is a diagram for describing that, in the second embodiment, a numerical control device that can simultaneously operate only four or less axes can control operation to make a direction of a tool parallel to a $^FZ$ direction in a feature coordinate system while keeping a position of the tip of the tool with respect to the workpiece.

FIG. 6 is a diagram for describing that, in the second embodiment, the numerical control device 1 that can simultaneously operate only four or less axes can control the first operation. FIG. 6 illustrates that the machine tool shifts from an initial state 61 to an intermediate state 62, and then shifts from the intermediate state 62 to a final state 63. The initial state 61 is the same state as a state of the machine tool illustrated in FIG. 5.

The division unit 5 divides operation of the five axes indicated to be simultaneously operated into two sets of operation of three axes. The first set obtained by the division is defined as a set including operation of three axes of operation of the first rotation axis 52, operation of the X axis, and operation of the Z axis. The second set obtained by the division is defined as a set including operation of three axes of operation of the second rotation axis 54, operation of the X axis, and operation of the Y axis.

The output unit 7 of the numerical control device 1 outputs information on the amount of operation of each axis for the first set to the motor drive unit 17, and the motor drive unit 17 drives the motor 18 in accordance with the information on the amount of operation of each axis for the first set, whereby the state of the machine tool shifts from the initial state 61 to the intermediate state 62. The position of the tip of the tool 53 in the intermediate state 62 is the same as the position of the tip of the tool 53 in the initial state 61.

Thereafter, the output unit 7 outputs information on the amount of operation of each axis for the second set to the motor drive unit 17, and the motor drive unit 17 drives the motor 18 in accordance with the information on the amount of operation of each axis for the second set, whereby the state of the machine tool shifts from the intermediate state 62 to the final state 63. In the final state 63, the axis of the tool 53 is parallel to the $^{F}Z$ direction in the feature coordinate system 57, and the tool 53 can properly machine the workpiece 51 in accordance with the machining program 8.

That is, when the machining program 8 is given including the command 9 for performing the first operation of simultaneously operating the five axes, the division unit 5 of the numerical control device 1 divides the operation of the five axes indicated to be simultaneously operated into two sets of operation of three axes. The division unit 5 calculates the amount of operation of each axis in each of the two sets obtained by the division, and the output unit 7 of the numerical control device 1 outputs information on the amount of operation of each axis in each of the two sets to the motor drive unit 17.

Since the operation of the five axes indicated to be simultaneously operated is divided into two sets of operation of three axes, it becomes unnecessary to change an orientation of the tool 53 by separating the tool 53 from the workpiece 51. That is, even when the numerical control device 1 is used that can simultaneously operate only four or less axes, it is unnecessary to change the orientation of the tool 53 by separating the tool 53 from the workpiece 51, so that the numerical control device 1 can control the position and orientation of the tool 53 with respect to the workpiece 51 as specified by the machining program 8 without increasing the machining time.

Incidentally, in the second embodiment, the machine tool includes the five axes of the first rotation axis 52, the second rotation axis 54, the X axis, the Y axis, and the Z axis. However, in addition to the above-described five axes, the machine tool may include, for example, an axis for implementing tilting of the tool 53 and an axis for implementing tilting of the table 55. In that case, the division unit 5 divides the operation of the five or more axes indicated to be simultaneously operated into the plurality of sets of operation of four or less axes.

Third Embodiment

Figure 7:
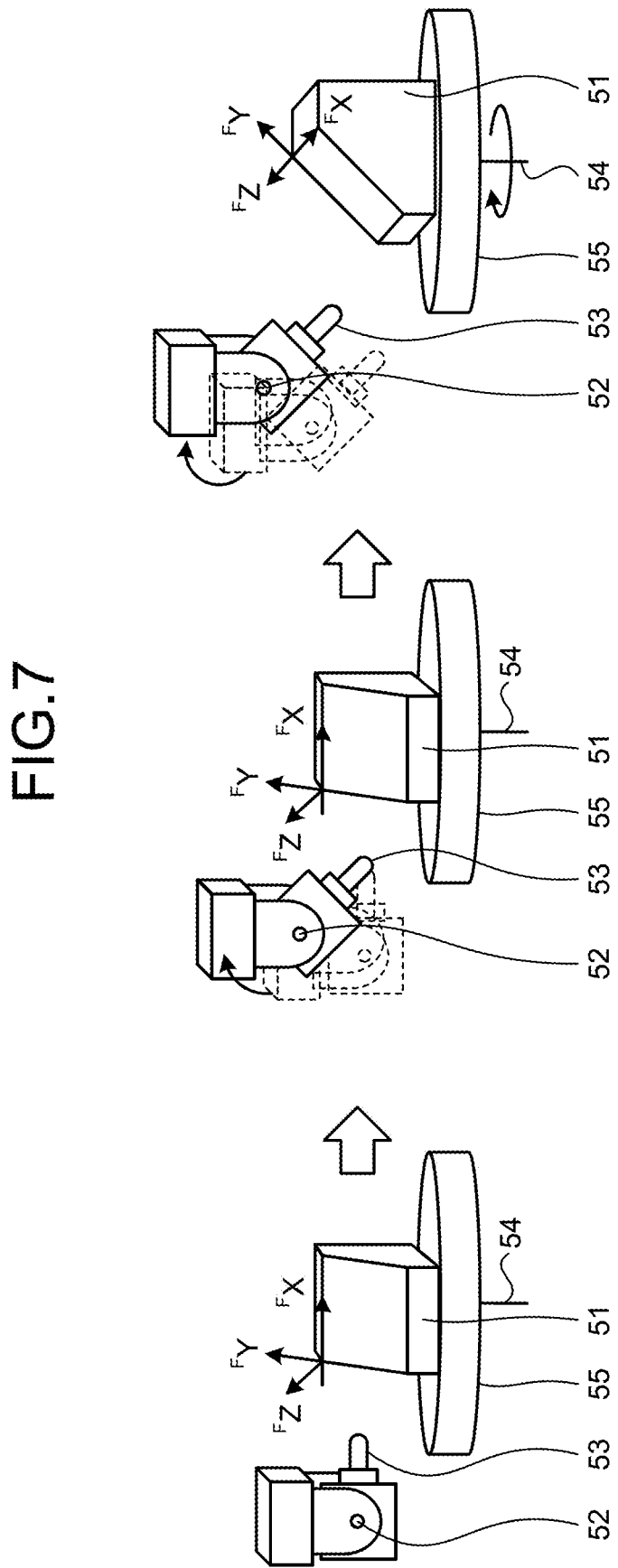
FIG. 7 is a diagram illustrating an example of operation of the machine tool in a third embodiment.
Figure 8:
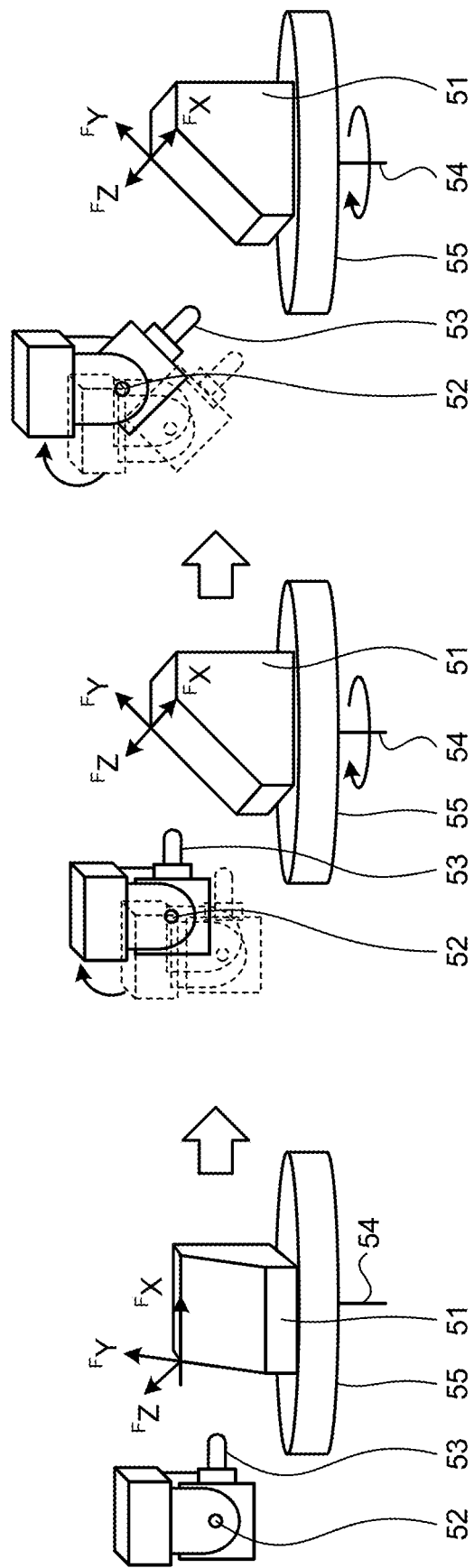
FIG. 8 is a diagram illustrating another example of the operation of the machine tool in the third embodiment.

Next, another example will be described of the operation of the numerical control device 1 described in the first embodiment with reference to FIGS. 7 and 8. FIG. 7 is a diagram illustrating an example of operation of the machine tool in a third embodiment. FIG. 8 is a diagram illustrating another example of the operation of the machine tool in the third embodiment. A configuration of the numerical control device 1 of the third embodiment is the same as the configuration of the numerical control device 1 of the first embodiment, but part of the function of the division unit 5 of the third embodiment differs from part of the function of the division unit 5 of the first embodiment. The machine tool of the third embodiment is the same as the machine tool of the second embodiment, and is constituted by the tool 53 having the first rotation axis 52 and the table 55 having the second rotation axis 54. In the third embodiment, a part different from the first embodiment will be described for the division unit 5 of the numerical control device 1.

FIG. 7 illustrates transition of the state of the machine tool in a case where the operation is performed of the set performing the operation of the first rotation axis 52 of the tool 53, and then the operation is performed of the set performing the operation of the second rotation axis 54 of the table 55. FIG. 8 illustrates transition of the state of the machine tool in a case where the operation is performed of the set performing the operation of the second rotation axis 54 of the table 55, and then the operation is performed of the set performing the operation of the first rotation axis 52 of the tool 53. The initial state of the transition illustrated in FIG. 7 is the same as the initial state of the transition illustrated in FIG. 8, and the final state of the transition illustrated in FIG. 7 is the same as the final state of the transition illustrated in FIG. 8.

Focusing on operation of rotating the second rotation axis 54 of the table 55, a distance to the first rotation axis 52 of the tool 53 from the second rotation axis 54 in FIG. 7 is shorter than a distance to the first rotation axis 52 of the tool 53 from the second rotation axis 54 in FIG. 8. That is, even when the states of the machine tool after the end of the transition are the same as each other, the amount of operation of the orthogonal axis in the transition in FIG. 7 is smaller than that in the transition in FIG. 8. The amount of operation of the orthogonal axis is an amount of movement of the orthogonal axis. Focusing on operation of rotating the first rotation axis 52 of the tool 53, the amount of operation of the orthogonal axis in the case of the transition in FIG. 7 is the same as that in the case of the transition in FIG. 8.

That is, even when the states of the machine tool after the transition are the same as each other, the amount of operation of the transition in FIG. 7 is smaller than the amount of operation of the transition in FIG. 8. In the third embodiment, the division unit 5 calculates a total amount of operation of the five or more axes after performing the division for each of a plurality of patterns each having different execution sequences of operation of the plurality of sets when operation of each axis is executed for each set, and selects a pattern having a minimum total amount of operation among the plurality of patterns. By the function of the division unit 5, the time from the start to the end of the transition of the machine tool can be minimized.

Incidentally, the output unit 7 outputs to the motor drive unit 17 information on the amount of operation of each axis in each of the plurality of sets calculated by the division unit 5 with the pattern selected by the division unit 5 in order in accordance with the control period. At that time, the output unit 7 outputs to the motor drive unit 17 information on the amount of operation of each axis of the set calculated first with the pattern selected by the division unit 5 prior to information on the amount of operation of each axis of the set other than the set calculated first among the plurality of sets included in the pattern selected.

Fourth Embodiment

Figure 9:
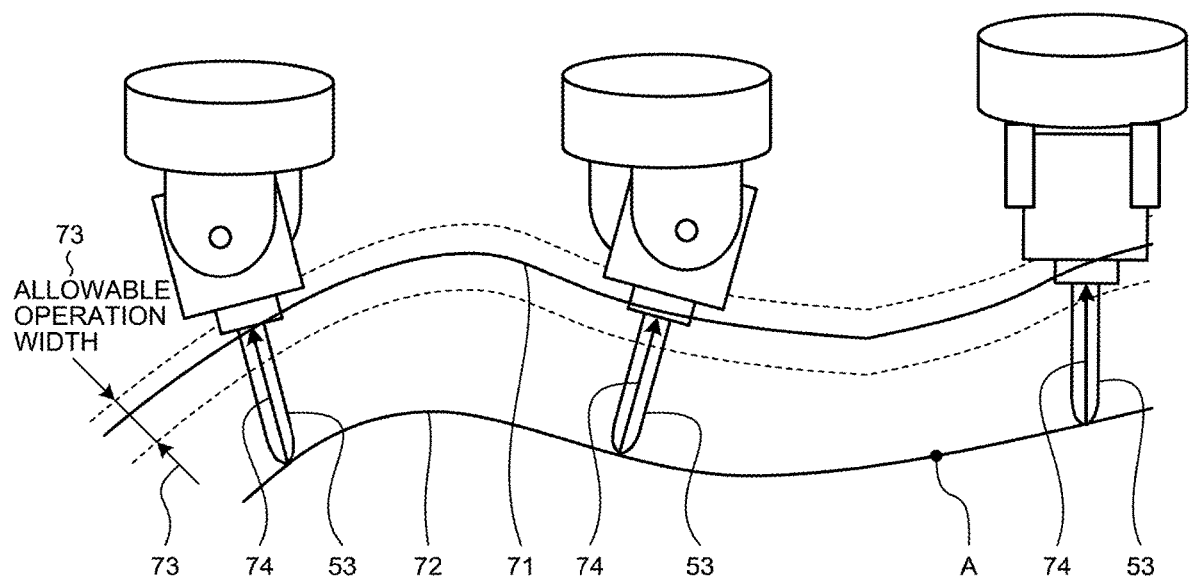
FIG. 9 is a diagram illustrating change in the orientation of the tool in a case where five axes included in the machine tool of FIG. 5 are simultaneously operated in a fourth embodiment.

Next, yet another example will be described of the operation of the numerical control device 1 described in the first embodiment with reference to FIGS. 9, 10, and 11. FIG. 9 is a diagram illustrating change in the orientation of the tool 53 in a case where the five axes included in the machine tool of FIG. 5 are simultaneously operated in a fourth embodiment. FIG. 9 illustrates a locus 71 of the bottom of the tool 53 and a locus 72 of the tip of the tool 53 in a case where the five axes are simultaneously operated.

In the fourth embodiment, an allowable width is set of operation of the bottom of the tool 53, and the allowable width is indicated as an allowable operation width 73 in FIG. 9. A vector 74 illustrated in the tool 53 of FIG. 9 indicates the orientation of the tool 53. Hereinafter, the vector 74 is described as "tool orientation vector 74". The tool orientation vector 74 indicates a distance and direction from the tip of the tool 53 to the bottom of the tool 53 at each time when the orientation of the tool 53 changes.

Figure 10:
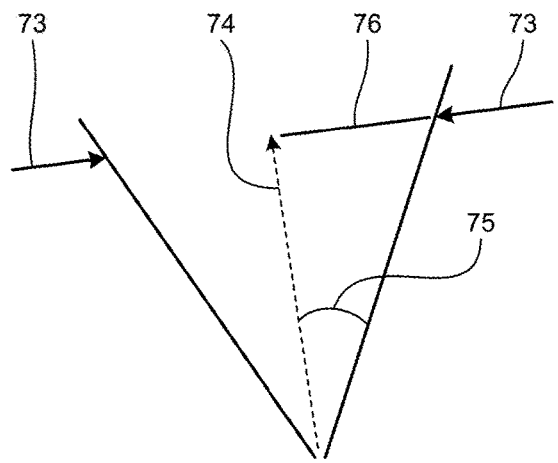
FIG. 10 is a diagram illustrating a relationship between a tool orientation vector and an allowable operation width in a case where the tip of the tool is positioned at a point A of FIG. 9 in the fourth embodiment.

FIG. 10 is a diagram illustrating a relationship between the tool orientation vector 74 and the allowable operation width 73 in a case where the tip of the tool 53 is positioned at a point A of FIG. 9 in the fourth embodiment. The allowable operation width 73 is defined by an angle 75 or a distance 76 with reference to the tool orientation vector 74.

Figure 11:
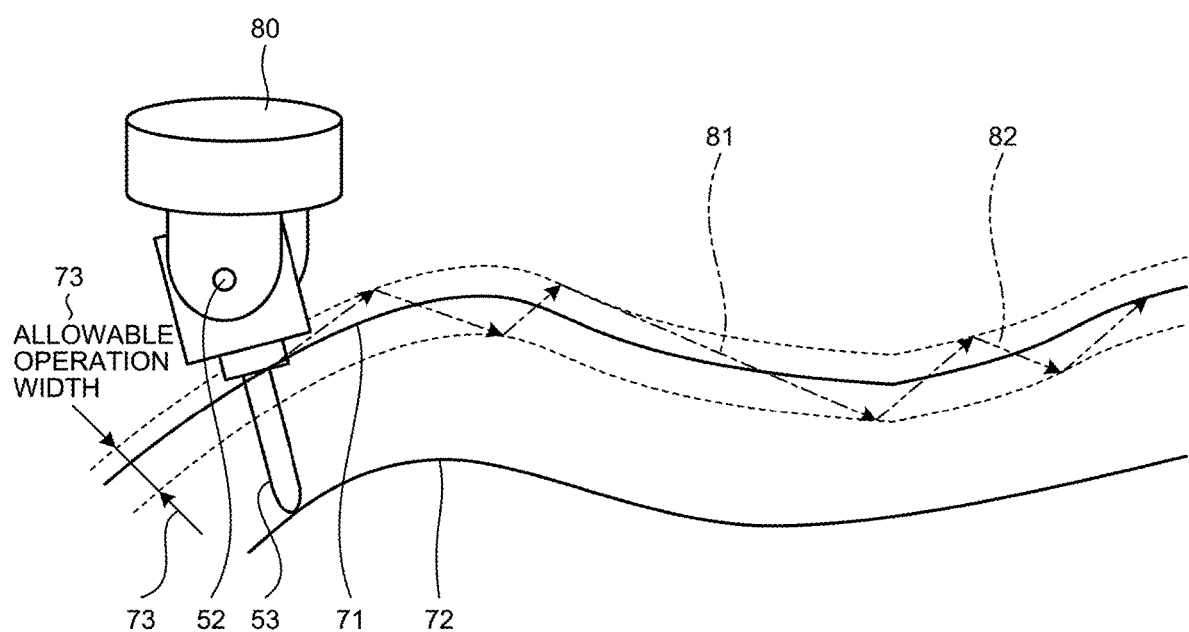
FIG. 11 is a diagram for describing an example of division of when the bottom of the tool is operated within a range of the allowable operation width in the case where the five axes included in the machine tool are simultaneously operated in the fourth embodiment.

FIG. 11 is a diagram for describing an example of division of when the bottom of the tool 53 is operated within a range of the allowable operation width 73 in the case where the five axes included in the machine tool are simultaneously operated in the fourth embodiment. In a case where the machining program 8 includes a command for simultaneously operating the five axes in the machine tool, when dividing, the division unit 5 of the numerical control device 1 performs the division to operate the tool 53 in the machine tool within the range of the allowable operation width 73 of when the five axes are simultaneously operated.

A first tool bottom path 81 in FIG. 11 illustrates a state of a path in a case where a rotation axis 80 on the bottom side of the tool 53 is operated and the first rotation axis 52 is not operated. A second tool bottom path 82 in FIG. 11 illustrates a state of a path in a case where the first rotation axis 52 is operated and the rotation axis 80 on the bottom side of the tool 53 is not operated.

Also in the fourth embodiment, the numerical control device 1 divides the operation of the five or more axes indicated to be simultaneously operated into the plurality of sets of operation of four or less axes. It is unnecessary to change the orientation of the tool 53 by separating the tool 53 from the workpiece 51, so that the numerical control device 1 can control the position and orientation of the tool 53 with respect to the workpiece 51 as specified by the machining program 8 without increasing the machining time.

In the fourth embodiment, the plurality of sets obtained by the division unit 5 includes a set in which the operation is performed relatively quickly and a set in which the operation is performed relatively slowly. In addition, there is a possibility that the position and orientation of the tool 53 with respect to the workpiece 51 is not brought to the position and orientation specified by the machining program 8 in the shortest time.

The configurations described in the above embodiments describe examples of contents of the present invention, and can be combined with other known techniques, and also a part of the configuration can be omitted or modified without departing from the gist of the present invention.

REFERENCE SIGNS LIST 1 numerical control device; 2 reading unit; 3 computation unit; 4 determination unit; 5 division unit; 6 interpolation unit; 7 output unit; 8 machining program; 13 priority information; 17 motor drive unit; 18 motor; 21 processing circuit; 31 memory; 32 processor; 51 workpiece; 52 first rotation axis; 53 tool; 54 second rotation axis; 55 table; 56 machine coordinate system; 57 feature coordinate system; 61 initial state; 62 intermediate state; 63 final state.

The invention claimed is:

1. A numerical control device to control a machine tool including a plurality of axes, comprising:
    circuitry configured to read a machining program for simultaneously operating five or more axes of the plurality of axes, the device controls operation of the five or more axes by dividing the operation into a plurality of sets of operation of four or less axes;
    a computer to compute an amount of operation of each of the plurality of axes based on the machining program read by the circuitry configured to read;
    circuitry configured to determine whether or not a result obtained by the computer indicates that five or more axes of the plurality of axes are simultaneously operated;
    circuitry configured to divide operation of the five or more axes indicated to be simultaneously operated into a plurality of sets of operation of four or less axes and calculate an amount of operation of each axis in each of the plurality of sets when it is determined by the circuitry configured to determine that the result indicates that the five or more axes of the plurality of axes are simultaneously operated; and
    circuitry configured to interpolate to calculate a position for each control period of a constituent element in the machine tool.

2. The numerical control device according to claim 1, further comprising
    a transmitter to output information on the amount of operation of each axis in each of the plurality of sets calculated by the circuitry configured to divide, in order in accordance with the control period for each set, to a motor driver to drive a motor to operate the constituent element.

3. The numerical control device according to claim 2, wherein
    the circuitry configured to divide selects a set including operation of an axis to be operated first from among the plurality of sets in accordance with priority information indicating the axis to be operated first among the five or more axes indicated to be simultaneously operated, first calculates an amount of operation of each axis of the set selected, and after calculating the amount of operation of each axis of the set selected, calculates an amount of operation of each axis of a set other than the set selected among the plurality of sets, and
    the transmitter outputs, to the motor driver, information on the amount of operation of each axis of the set selected prior to information on the amount of operation of each axis of the set other than the set selected among the plurality of sets.

4. The numerical control device according to claim 1, wherein
    the circuitry configured to divide selects a set including operation of an axis to be operated first from among the plurality of sets in accordance with priority information indicating the axis to be operated first among the five or more axes indicated to be simultaneously operated, first calculates an amount of operation of each axis of the set selected, and after calculating the amount of operation of each axis of the set selected, calculates an amount of operation of each axis of a set other than the set selected among the plurality of sets.

5. The numerical control device according to claim 1, wherein
    the circuitry configured to divide calculates a total amount of operation of the five or more axes after dividing, for each of a plurality of patterns each having different execution sequences of operation of the plurality of sets when operation of each axis is executed for each set, and selects a pattern having a minimum total amount of operation among the plurality of patterns.

6. The numerical control device according to claim 5, further comprising
    a transmitter to output information on an amount of operation of each axis in each of the plurality of sets calculated by the circuitry configured to divide with the pattern selected by the circuitry configured to divide, in order in accordance with the control period for each set, to a motor driver to drive a motor to operate the constituent element, wherein
    the transmitter outputs, to the motor driver, information on an amount of operation of each axis of a set calculated first with the pattern selected prior to information on an amount of operation of each axis of a set other than the set calculated first among the plurality of sets included in the pattern selected.

7. The numerical control device according to claim 1, wherein
- the five or more axes indicated to be simultaneously operated are five axes, and
- when dividing, the circuitry configured to divide performs the division to operate a tool in the machine tool within a range of an allowable operation width of the tool in a case where the five axes are simultaneously operated.

8. The numerical control device according to claim 1, wherein
- the machine tool includes an orthogonal axis and a rotation axis, and
- when five or more axes are simultaneously operated in a case where indexing operation is performed to position the orthogonal axis and the rotation axis to control a position and an orientation of a tool with respect to the workpiece in the machine tool in a coordinate system newly defined by performing one or both of translation and rotation with respect to a reference coordinate system,
- the circuitry configured to divide divides operation of the five or more axes into a plurality of sets of operation of four or less axes.

\* \* \* \* \*